United States Patent
Bell et al.

(10) Patent No.: US 10,761,717 B2
(45) Date of Patent: Sep. 1, 2020

(54) CONTROLLING APPLICATION LAUNCH

(71) Applicant: INTERNATIONAL BUSINESS MACHINES CORPORATION, Armonk, NY (US)

(72) Inventors: David R. Bell, Southampton (GB); Christopher Phillips, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 14/508,743

(22) Filed: Oct. 7, 2014

(65) Prior Publication Data
US 2015/0106762 A1    Apr. 16, 2015

(30) Foreign Application Priority Data
Oct. 10, 2013   (GB) .................................. 1317959.3

(51) Int. Cl.
*G06F 3/0488*  (2013.01)
*G06F 9/445*   (2018.01)
*G06F 9/451*   (2018.01)

(52) U.S. Cl.
CPC .......... *G06F 3/04883* (2013.01); *G06F 9/445* (2013.01); *G06F 9/451* (2018.02)

(58) Field of Classification Search
CPC .... G06F 3/04883; G06F 9/4443; G06F 9/445; G06F 3/0488; G06F 3/017
See application file for complete search history.

(56) References Cited

U.S. PATENT DOCUMENTS

| | | | |
|---|---|---|---|
| 5,978,775 A | * | 11/1999 | Chen .................. G06Q 30/0633 705/26.8 |
| 6,088,731 A | * | 7/2000 | Kiraly ............... G06F 17/30864 707/E17.108 |

(Continued)

FOREIGN PATENT DOCUMENTS

| | | |
|---|---|---|
| EP | 1615109 | 1/2006 |
| JP | 07230374 | 8/1995 |

(Continued)

OTHER PUBLICATIONS

Author: Brink Title: Windows 7: Operating System to Start Change Display List Time Date: Jan. 17, 2009 p. 1-9.*

(Continued)

*Primary Examiner* — Ajay M Bhatia
*Assistant Examiner* — Phoebe X Pan
(74) *Attorney, Agent, or Firm* — Law Office of Jim Boice

(57) ABSTRACT

A method, apparatus, and/or computer program product control how an application window of a graphical user interface will open. A computing device defines a time period immediately after an application launch selection action by a user and before an on-screen drawing of the application window. A gesture input hardware sensing device senses a gesture input during the time period. A gesture recognition engine recognizes the gesture input. Based on at least one of a type and location of a recognized gesture input, the computing device selects the window location and window dimensions of the application window. The computing device draws the application window on-screen using a selected window location and selected window dimensions for the application window.

20 Claims, 6 Drawing Sheets

(56) References Cited

U.S. PATENT DOCUMENTS

| | | | | |
|---|---|---|---|---|
| 6,342,908 | B1* | 1/2002 | Bates | G06F 3/0481 715/789 |
| 6,862,712 | B1 | 3/2005 | Nakagawa et al. | |
| 7,028,264 | B2* | 4/2006 | Santoro | G06F 3/0481 715/729 |
| 7,034,777 | B1* | 4/2006 | McLarty | G06F 3/1415 345/1.1 |
| 7,626,587 | B1* | 12/2009 | de Waal | G06F 3/1431 345/1.1 |
| 8,196,055 | B2 | 6/2012 | Zotov et al. | |
| 8,345,017 | B1* | 1/2013 | Cho | G06F 3/04886 345/173 |
| 8,743,089 | B2* | 6/2014 | Sato | G06F 3/017 345/158 |
| 9,003,325 | B2* | 4/2015 | Jitkoff | G06F 3/0481 715/790 |
| 9,110,663 | B2* | 8/2015 | Gyorfi | G06F 9/542 |
| 2002/0140742 | A1* | 10/2002 | Lection | G06F 3/0482 715/835 |
| 2003/0048275 | A1* | 3/2003 | Ciolac | G09G 5/14 345/544 |
| 2004/0027392 | A1* | 2/2004 | Dunn | G06F 1/1626 715/810 |
| 2004/0036662 | A1* | 2/2004 | Sakumura | G09G 5/14 345/1.3 |
| 2006/0010400 | A1* | 1/2006 | Dehlin | G06F 3/0354 715/856 |
| 2006/0242607 | A1* | 10/2006 | Hudson | G06F 3/04817 715/863 |
| 2007/0180400 | A1* | 8/2007 | Zotov | G06F 3/0481 715/788 |
| 2009/0298418 | A1* | 12/2009 | Michael | H04H 60/31 455/3.04 |
| 2009/0310889 | A1* | 12/2009 | Matsushima | G06F 9/445 382/305 |
| 2009/0322689 | A1* | 12/2009 | Kwong | G06F 3/04883 345/173 |
| 2010/0088634 | A1 | 4/2010 | Tsuruta et al. | |
| 2011/0107272 | A1* | 5/2011 | Aguilar | G06F 3/04815 715/853 |
| 2011/0154248 | A1 | 6/2011 | Tsuruoka | |
| 2011/0209104 | A1* | 8/2011 | Hinckley | G06F 3/0416 715/863 |
| 2011/0244924 | A1* | 10/2011 | Jung | G06F 3/0481 455/566 |
| 2011/0316797 | A1 | 12/2011 | Johansson et al. | |
| 2012/0023431 | A1* | 1/2012 | Roth | G06F 3/0488 715/772 |
| 2012/0084677 | A1* | 4/2012 | Sirpal | G06F 1/1616 715/761 |
| 2012/0179969 | A1 | 7/2012 | Lee et al. | |
| 2012/0242596 | A1* | 9/2012 | Sip | G06F 3/04883 345/173 |
| 2012/0280898 | A1* | 11/2012 | Lucero | G06F 3/1446 345/156 |
| 2012/0304092 | A1* | 11/2012 | Jarrett | G06F 9/4443 715/765 |
| 2012/0304108 | A1* | 11/2012 | Jarrett | G06F 3/04883 715/781 |
| 2012/0304114 | A1* | 11/2012 | Wong | G06F 3/0488 715/800 |
| 2013/0076595 | A1* | 3/2013 | Sirpal | G06F 3/1438 345/1.3 |
| 2013/0086508 | A1 | 4/2013 | Oguz | |
| 2013/0097556 | A1* | 4/2013 | Louch | G06F 3/0488 715/790 |
| 2013/0106707 | A1* | 5/2013 | Chen | G06F 3/04883 345/173 |
| 2013/0139109 | A1* | 5/2013 | Kim | G06F 3/04883 715/835 |
| 2013/0241954 | A1* | 9/2013 | Yu | G06F 3/1446 345/629 |
| 2013/0263042 | A1* | 10/2013 | Buening | G06F 3/0488 715/783 |
| 2014/0108933 | A1* | 4/2014 | Lee | G06F 3/04883 715/722 |
| 2014/0184526 | A1* | 7/2014 | Cho | G06F 3/041 345/173 |
| 2014/0292702 | A1* | 10/2014 | Samejima | G06F 3/04883 345/173 |
| 2014/0298258 | A1* | 10/2014 | Doan | G06F 9/4443 715/810 |
| 2014/0310642 | A1* | 10/2014 | Vranjes | G06F 3/0481 715/781 |
| 2014/0313103 | A1* | 10/2014 | Goel | G06F 3/1454 345/2.2 |
| 2014/0325433 | A1* | 10/2014 | Hiroura | G06F 3/0488 715/789 |
| 2015/0067521 | A1* | 3/2015 | Heo | G06F 3/1446 715/733 |
| 2015/0067579 | A1* | 3/2015 | Jeong | G06F 3/0488 715/781 |
| 2017/0220179 | A1* | 8/2017 | Szeto | G06F 3/0416 |
| 2018/0129362 | A1* | 5/2018 | Sirpal | G06F 1/1616 |

FOREIGN PATENT DOCUMENTS

| | | |
|---|---|---|
| JP | 2001296945 | 10/2001 |
| WO | 2010025557 | 3/2010 |
| WO | 2011126502 | 10/2011 |
| WO | 2013145485 | 10/2013 |

OTHER PUBLICATIONS

Steven Sinosky, "Enhancing Windows 8 for Multiple Monitors", Microsoft, blogs.msdn.com, May 21, 2012, pp. 1-14.

Anonymous, "Method and Process for Predefining and Leveraging Display Sensitive Window Arrangements" IP.com, IPCOM000211123D, Sep. 21, 2011, pp. 1-4. (Abstract Only).

Matthew Casperson, "Control a Flex Video Application Using Mouse Gestures", Envato Pty Ltd, code.tutsplus.com, Oct. 23, 2009, pp. 1-13.

Anonymous, "Arrange Windows Side by Side on the Desktop Using Snap", Microsoft, windows.microsoft.com, retrieved Oct. 7, 2014, 1 page.

Opera Software ASA, "Mouse Gestures in Opera", www.opera.com/help/tutorials/gestures/, retrieved Oct. 7, 2014, pp. 1-2.

IBM Corporation, "Splash Screen Movable to Determine on Which Monitor the Associated Application Appears", IP.com, IP000187465, Sep. 7, 2009, pp. 1-2.

Anonymous, "Gesture recognition", Wikimedia Foundation, Inc., wikipedia.org, retrieved Oct. 9, 2014, last modified Jul. 30, 2014, pp. 1-5.

G. Shultz, "Enhance Your Windows 7 Multiple-Monitor System With DisplayFusion", TechRepublic, techrepublic.com, Aug. 4, 2011, pp. 1-11.

* cited by examiner

CONTROLLING APPLICATION LAUNCH

BACKGROUND

The invention relates to graphical user interfaces. More particularly the invention relates to controlling the launch characteristics of an application window in a graphical user interface.

A modern operating system having a graphical user interface in, for example, a personal computer, allows flexibility in the characteristics at launch of application windows. By default, a window may display in one of a number of screen locations. A user may be able to control how individual application windows display when an instance of the application is started, or the operating system may remember the settings used the last time an instance of the application was started. An operating system may be set to display an application window maximized over a whole display screen, on one of multiple display screens or across more than one display screen. It may alternatively be set to split a single display into different sections which can each display an application window. In example known operating systems a user may move and otherwise change the appearance of the application window after it has opened. In known systems it is not possible to change the way an application will open at the point at which it is selected for starting.

Therefore there is a need in the art to address the aforementioned problem.

SUMMARY

In one embodiment of the present invention, a method and/or computer program product controls how an application window of a graphical user interface will open. A computing device defines a time period immediately after an application launch selection action by a user and before an on-screen drawing of the application window. A gesture input hardware sensing device senses a gesture input during the time period. A gesture recognition engine recognizes the gesture input. Based on at least one of a type and location of a recognized gesture input, the computing device selects the window location and window dimensions of the application window. The computing device draws the application window on-screen using a selected window location and selected window dimensions for the application window.

In one embodiment of the present invention, a computing apparatus controls how an application window of a graphical user interface will open on a display screen apparatus. The computing apparatus comprises: a timer hardware component for defining a time period immediately after an application launch selection action by a user and before an on-screen drawing of the application window; a listener process hardware component for sensing a gesture input during the time period; a gesture recognition engine hardware component for recognizing the gesture input; a selector hardware component for selecting, based on at least one of a type and location of the recognized gesture input, a window location and window dimensions of the application window; and a window manager hardware component for drawing the application window on-screen using a selected window location and window dimensions of the application window.

BRIEF DESCRIPTION OF THE SEVERAL VIEWS OF THE DRAWINGS

Preferred embodiments of the present invention will now be described, by way of example only, with reference to the following drawings in which.

DETAILED DESCRIPTION

Figure 1:
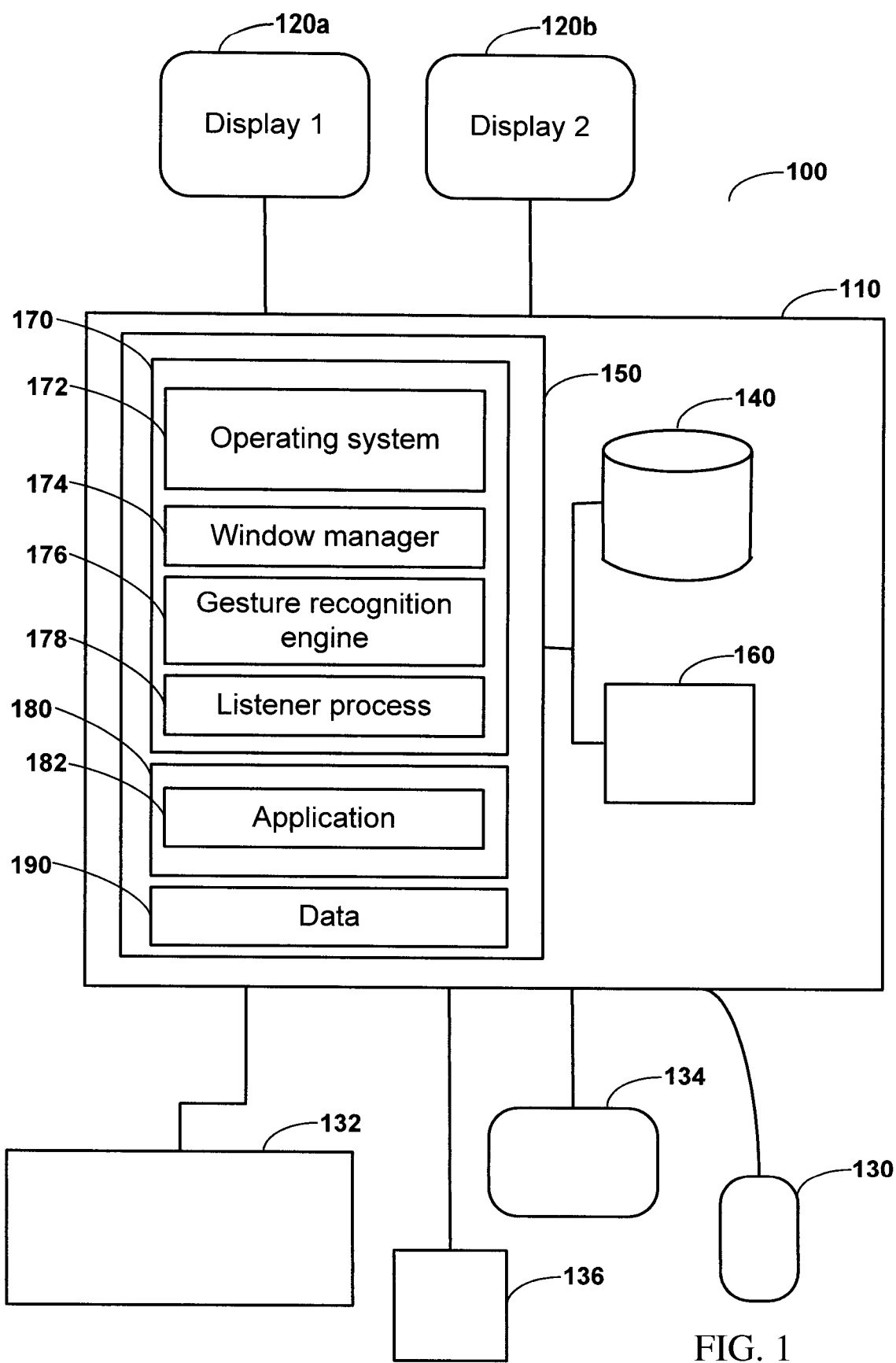
FIG. 1 illustrates an apparatus including a preferred embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates the arrangement of a computing device 100 suitable for use with embodiments of the invention. A skilled person will understand that computing device 100 may comprise, for example, a desktop personal computer, a laptop computer, a handheld computing or communications device, a remote terminal for a network-linked server computer, or other computing arrangement. In the embodiment illustrated, computing device 100 comprises processing unit 110, and at least one display 120. In the illustrated embodiment there is shown display 1, 120a, and display 2, 120b. Additional displays are advantageous in many environments in which the display of large amounts of information is desirable. In some embodiments, a single application may be opened so as to cover the screen areas of two displays. Each display 120 provides interaction with computing device 100 by way of a display interface, for example a graphical user interface (GUI) in which, for example, an instance of an individual software application after its selection and launch is run in a window on the GUI.

One or more input devices is provided for user interaction with processing unit 110 of computing device 100. Illustrated in FIG. 1 are input devices mouse 130, keyboard 132, touchpad 134 connected to processing unit 110. One additional input device 136 is shown for illustration, and may comprise for example a joystick, a trackball or similar device. Although shown as separate units in the illustrated embodiment, a person skilled in the art will understand that one or more of the constituent parts of computing device 100 may be situated in a single physical unit without departing from the scope of the invention.

Processing unit 110 may comprise one or more non-volatile storage device for persistent storage of operating software, application software and data for use by processing unit 110. Illustrated is an embodiment in which processing unit 110 comprises hard disk drive unit 140 mounted internally to processing unit 110. A person skilled in the art will understand that non-volatile storage as illustrated by hard disk drive 140 may be external to processing unit 110 and linked to processing unit 110 by wired or wireless communication means, or situated at a geographically remote site and accessible via wired or wireless communication over a communications network, such as the Internet.

Also provided is volatile storage 150 which may be, for example, random access memory (RAM) into which is loaded system software 170, application software 180 and data 190 under the control of processes executing in computing device central processing unit 160. Although illustrated as a single processor, it will be apparent to a skilled person that one or more general purpose or specialist processors may be present in processing unit 110 of computing device 100 interacting with volatile storage 150 and non-volatile storage 140. On startup of computing device 100, system software 170 is loaded into volatile storage 150 under the control of a basic input output system (BIOS) program, which is permanently stored in non-volatile storage, for example in a dedicated BIOS read-only memory (ROM) microprocessor (not shown), or in other non-volatile storage such as non-volatile storage 140.

System software 170 comprises operating system 172 of computing device 100, and window manager 174 which controls user interaction with the GUI displayed on display device or devices 120. Window manager 174 is shown in the illustrated embodiment as a separate module for convenience of description, but in some embodiments it may be an integral part of operating system 172. In a preferred embodiment, system software 170 also comprises a gesture recognition engine 176. Gesture recognition engine 176 operates in concert with window manager 174 and is software capable of the recognition of gestures entered by a user by means of an input device, for example mouse 130, touchpad 134 or other input device 136. Gestures are seen as a sequence of movements of a cursor controlled by input device, for example mouse 130, on the GUI displayed on display device or devices 120.

In a preferred embodiment of the present invention, a user selects for startup a software application 182, the program code for which is stored for example on hard disk drive 140. This may be by user selection action using an input device, for example mouse 130, touchpad 134 or other input device 136. In one embodiment, selection is by use of mouse 130 to select from a startup menu of the GUI. In another embodiment, a GUI icon representing the chosen software application 182 is selected by for example a mouse button double click action. User selection action results in commencement of startup of software application 182.

In a preferred embodiment, the user selection action commencing startup of software application 182 also causes launch, by for example window manager 174, of listener process 178 by loading of software code for listener process 178 from, for example, non-volatile storage 140 to volatile storage 150. Listener process 178 listens for user input in the form of gestures input by a user input device, for example mouse 130, immediately after commencement of startup of software application 182.

Figure 2A:
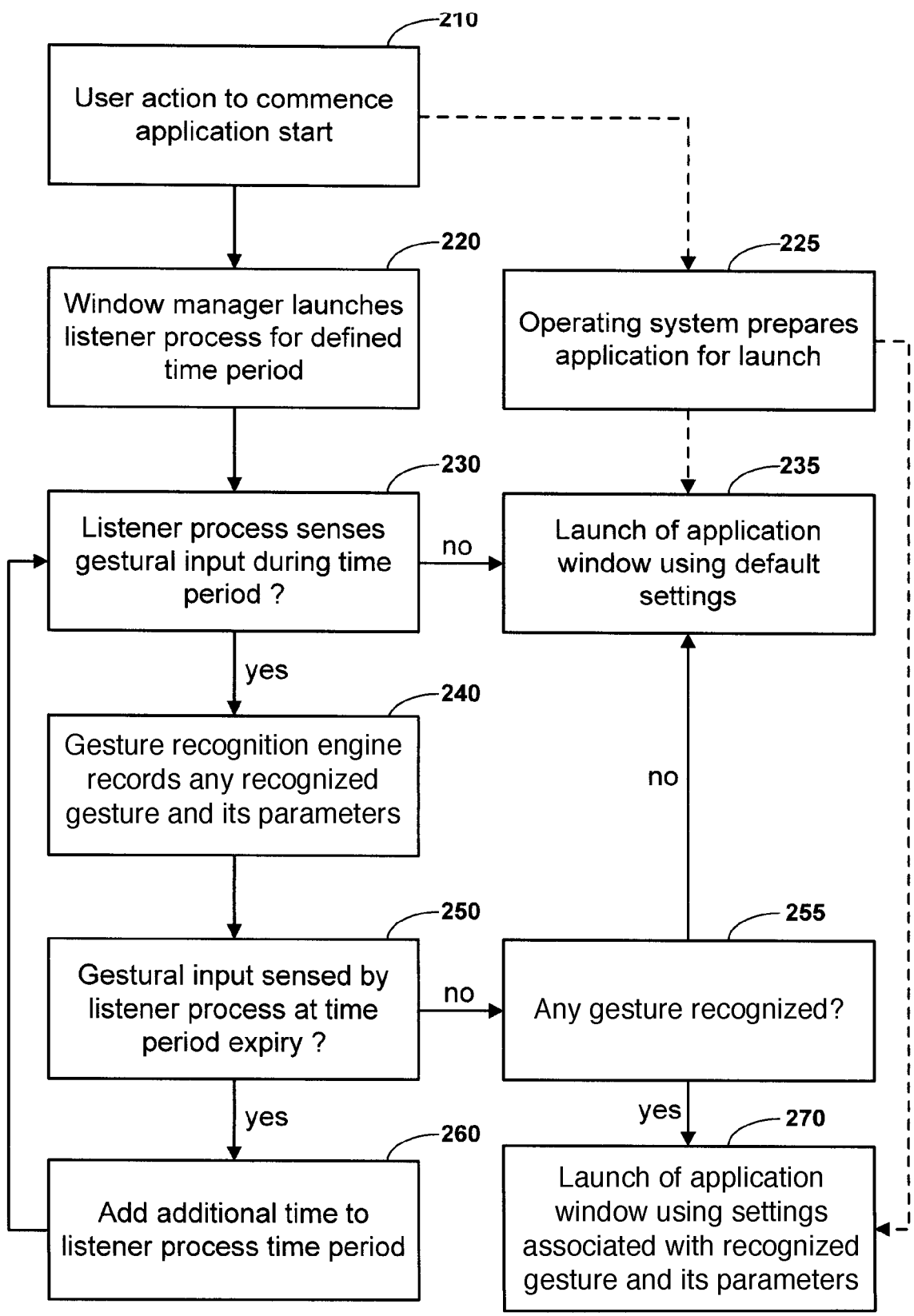
FIG. 2a illustrates a flow diagram of a method according to a preferred embodiment of the present invention.

FIG. 2a is a flow diagram illustrating the progress of a preferred embodiment of the present invention. At step 210, there is a user action for commencement of an application, such as application 182, by for example user selection action using an input device such as mouse 130. In response, window manager 174 launches listener process 178 at step 220. Listener process 178 listens for user input for an initial time period. In one embodiment this initial time period is 2 seconds, although a person skilled in the art will understand that any suitable time period may be set. In parallel with step 220 as indicated by the dashed arrow, the operating system 172 prepares the selected application, such as application 182, for launch at step 225.

If listener process 178 does not detect any user gestural input at step 230, then the "no" branch applies, and operating system 172 signals to window manager 174 to launch an instance of application 182 as prepared at step 225 in, for example, an application window using default settings at step 235. The default settings used may be those defined as defaults by the operating system 172 or application 182, or may be defaults for the application as previously defined by a user, or settings saved when the previous instance of application 182 was closed, and stored with other settings of operating system 172 or window manager 174 in non-volatile storage 140.

If at step 230 listener process 178 senses gestural input by a user using an input device such as mouse 130 ("yes" branch at step 230), then gesture recognition engine 176 is invoked to attempt to match gestural input against a set of known gestures at step 240. Any suitable gesture recognition engine may be used in embodiments of the present invention. Gesture recognition is a technology with an extensive literature and gesture recognition engines are well known in the art. A set of known gestures may be defined in gesture recognition engine 176, for example provided with the gesture recognition engine, or defined by a user in, for example, a learning mode of the gesture recognition engine.

If at step 240 a gesture is recognized by gesture recognition engine 176 within the confidence level required to accept the gesture as being recognized, then the gesture and other parameters of the gesture are recorded. Such other parameters may include, for example, the size and position of the gesture, or parts of the gesture, on the GUI of display or displays 120.

At step 250, the initial time period ends. If at the end of this time period no gestural input is being sensed, then the "no" branch applies and the process moves to step 255. If no gesture has been recognized at step 240, then the "no" branch at step 255 applies and the process moves to step 235 and the operating system 172 causes window manager 174 to launch an instance of application 182 as prepared at step 225 in, for example, an application window using default settings.

If at step 250 gestural input is still being sensed by listener process 178 at the expiry of the initial time period, then an additional time period is added for listener process 178 to continue to listen for gestural input at step 260. In one embodiment, the additional time period is 1 second, although a person skilled in the art will understand that any suitable time period may be set. The process then returns to repeat from step 230. The process may continue for further cycles adding a further additional time period at step 260 if gestural input is still being sensed ("yes" branch at step 250) until no gestural input is sensed at time period expiry by listener process 178 at step 250.

The process then follows the "no" branch to step 255. If a gesture has been recognized then the "yes" branch at step 255 operates and the process moves to step 270. At step 270, the settings associated with the gesture and any parameters of the gesture, such as size or position, are used by the operating system 172 and window manager 174 to control the appearance and/or position of the started instance of the application as prepared at step 225, for example application 182.

Figure 2B:
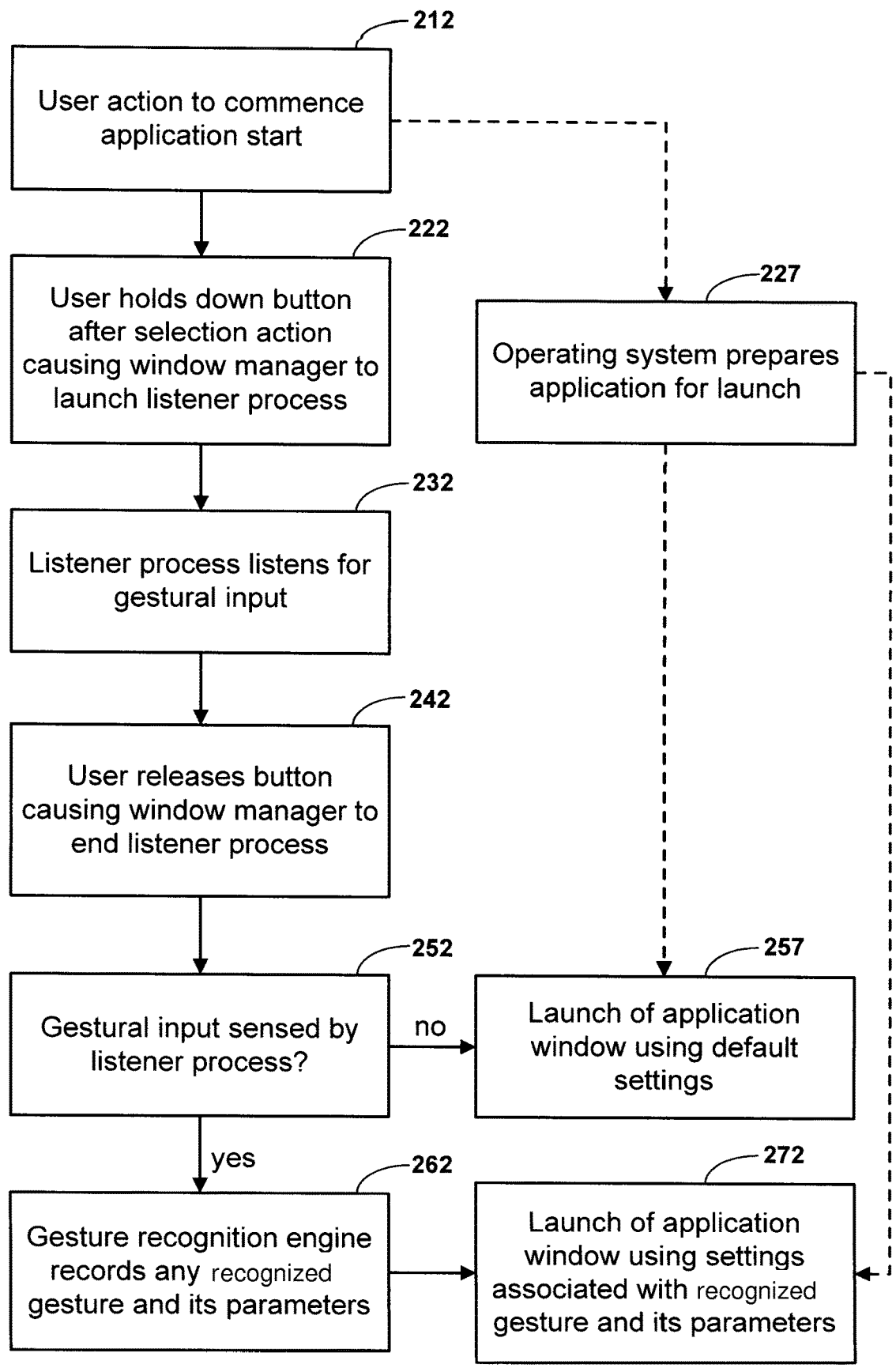
FIG. 2b illustrates a flow diagram of a method according to a further preferred embodiment of the invention.

An alternative embodiment is illustrated by the flow chart in FIG. 2b. In this alternative embodiment, listener process 178 is launched by the user holding down selection button of user input device, for example mouse 130. At step 212, there is user selection action for commencement of an application such as application 182, using for example mouse 130. In this embodiment, the user holds down the mouse button at the end of the selection action rather than releasing it. Operating system 172 recognizes the hold down and instructs window manager 174 to launch listener process 178 at step 222. In parallel as indicated by the dashed arrow, operating system 172 prepares the application, such as application 182, for launch at step 227.

For the duration of the button hold down, listener process 178 listens for gestural input at step 232. The user releases the held down button of mouse 130 and in response to the event generated thereby operating system 172 causes window manager 174 to end listener process 178 at step 242. If no gestural input is recognized by gesture recognition engine 176 during this time period (step 252) the "no" branch applies and operating system 172 causes window manager 174 to launch the application as prepared at step 257 in an application window using window manager default settings. If gestural input is recognized in this period, the "yes"

branch operates at step 252 and gesture recognition engine 176 records any recognized gesture and parameters such as screen position at step 262 and the operating system 172 causes window manager to launch the application as prepared at step 227 in an application window using the settings associated with the recognized gesture and parameters at step 272.

It will be apparent to a person skilled in the art that variations of the above are possible without departing from the scope of the present invention.

Further figures will be used to describe embodiments of the invention using particular example gestures.

Figure 3A:
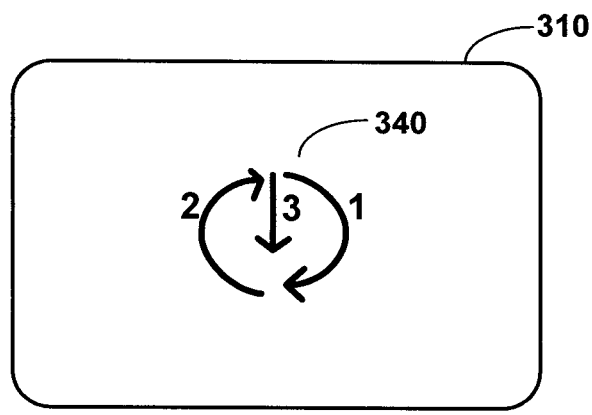
FIGS. 3a to 3e illustrate example gestures which may be inputted according to preferred embodiments of the present invention.

FIG. 3*a* illustrates display screen 310 on which is drawn gesture 340. A user has selected an application for launch using, for example, mouse 130 selecting from a start menu of an operating system graphical user interface on display 310. Commencement of launch of an application such as application 182 causes window manager 174 to launch listener process 178. Listener process 178 listens for gestural input for an initial time period. The user draws gesture 340 which is shown in FIG. 3*a* as a sequence of movements of an on-screen cursor illustrated as arrows 1, 2 and 3. In reality, the user enters the three sequential movements as a continuous flowing movement, ceasing movement at the end of arrow 3. Listener process 178 works in concert with gesture recognition engine 176, transferring gestural input to gesture recognition engine 176. Gesture recognition engine 176 attempts to match gesture 340 with known gestures which are stored by gesture recognition engine 176 in a data structure together with settings corresponding to launch parameters of the selected application, such as application 182. Alternatively, general launch parameters for all applications may be stored in the data structure of gesture recognition engine 176. If gesture recognition engine 176 matches gesture 340 to launch parameters in its data structure, these parameters are used to launch an instance of the selected application, such as application 182.

In FIG. 3*a*, gesture 340 comprises an approximately circular gesture part indicated by arrows 1 and 2 in the central area of display screen 310, followed by a short downward gesture part 3 ending in the approximate centre of display screen 310. In this embodiment, this gesture type and position indicates to gesture recognition engine 176 that an instance of the selected application, such as application 182, should be launched occupying the full area of display screen 310. This is communicated to window manager 174 which causes the application instance to be launched in this way.

Figure 3B:
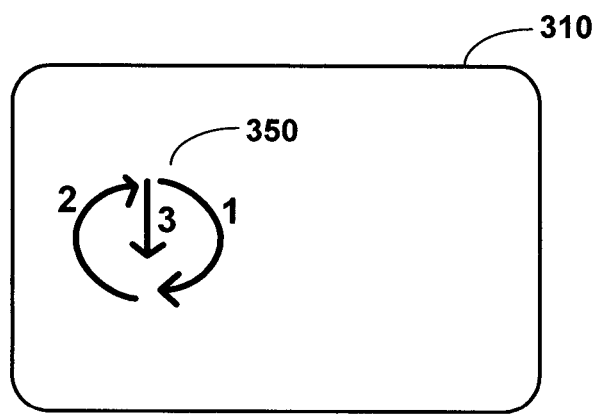

FIG. 3*b* illustrates a similar gesture 350, but centered approximately in the centre of the left hand half of display screen 310 so that gesture part 3 ends in the approximate centre of the left hand half of the display. In this embodiment, this gesture type and position indicates to gesture recognition engine 176 that an instance of the selected application, such as application 182, should be launched occupying the whole of the left hand half of display screen 310.

Figure 3C:
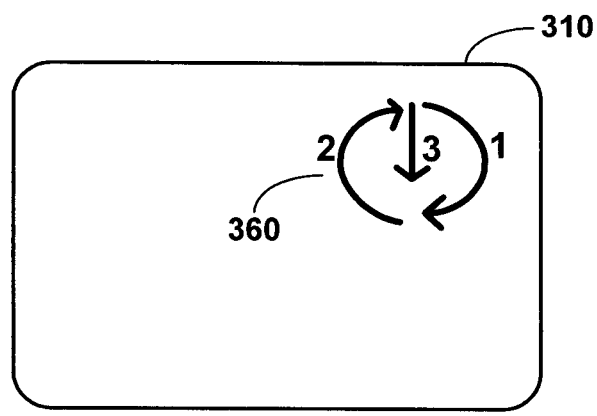

FIG. 3*c* illustrates a further similar gesture 360, but centered approximately in the centre of the top right quadrant of display screen 310 so that gesture part 3 ends in the approximate centre of the top right quadrant of the display. In this embodiment, this gesture type and position indicates to gesture recognition engine 176 that an instance of the selected application, such as application 182, should be launched occupying the whole of the top right quadrant of display screen 310.

Figure 3D:
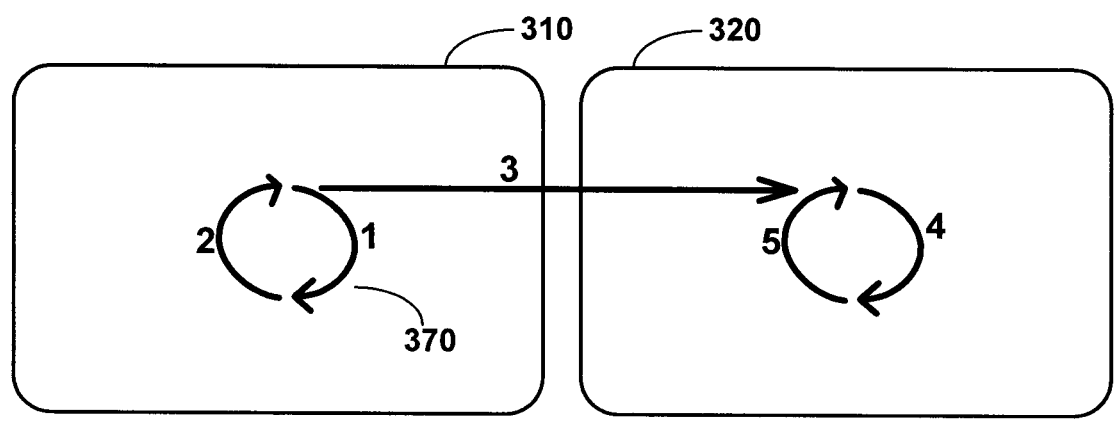

FIG. 3*d* illustrates an embodiment where two display screens 310, 320 are being used in concert to display a graphical user interface across both displays. A gesture 370 is entered by a user as a sequence of gesture parts 1 to 5. Gesture parts 1 and 2 are entered at the approximate centre of display screen 310, followed by gesture part 3, an approximate straight line movement across to the second display screen 320, and ending with gesture parts 4 and 5 at the approximate centre of display screen 320. This may indicate, for example, to gesture recognition engine 176 that the application instance should be launched across the full areas of both display screens 310 and 320. As before, this is communicated to window manager 174 which controls the launch across both display screens. In another embodiment, the above gesture, or another defined gesture, may specify that the application opens only on a secondary display screen.

Figure 3E:
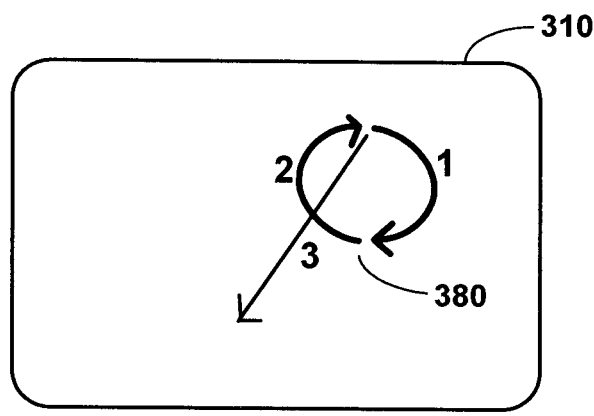
Figure 3F:
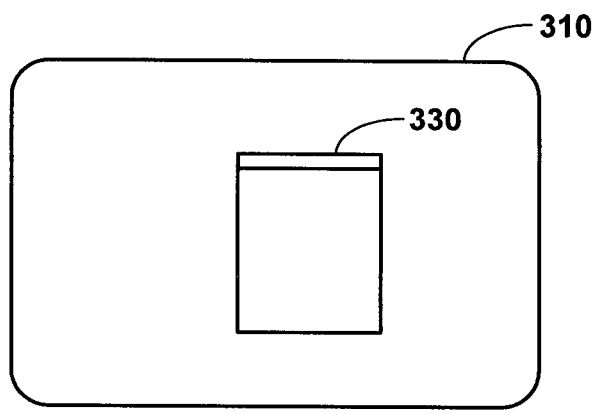
FIG. 3f illustrates the window resulting from the example gesture illustrated in FIG. 3e according to a preferred embodiment of the present invention.

FIG. 3*e* illustrates an embodiment comprising a further example gesture. In this embodiment, gesture 380 is entered as parts 1 and 2, followed by a long diagonal movement, gesture part 3. In this embodiment, the long gesture part 3 indicates a precise window size to gesture recognition engine 176, with the start and end of gesture part 3 indicating diagonally opposite corners of a graphical user interface window. This is communicated to window manager 174 which causes an instance of the selected application, such as application 182, to be launches as illustrated in FIG. 3*f* as window 330.

The present invention provides a method in a computing device of controlling how an application window of a graphical user interface will open. The method includes the following steps. A time period is defined immediately after an application launch selection action by a user and before the drawing on screen of the application window. During the time period, a gesture input is sensed, and this is then recognized by a gesture recognition engine. The computing device then selects, based on at least one of a type and location of the recognized gesture input, a window location and dimensions which are then used for the window which is then opened.

Preferably, gesture input is by means of a cursor control device which does not contact screen apparatus displaying the graphical user interface. Advantageously, this feature provides for gesture entry without using a touch screen interface.

Preferably, the cursor control device comprises one of a mouse, a joystick, a trackball and a touchpad. Advantageously, this feature provides a method of input using particular gesture input devices.

Preferably, the window location is selected from a set of predefined window locations. Advantageously, this feature allows the user to select a location from a set of known window locations for startup of the selected application.

Preferably, the set of predefined window locations are definable by a user. Advantageously, this feature allows a user to specify their own preferred locations for startup of the selected application.

Preferably, the window dimensions are selected from a set of predefined window dimensions. Advantageously, this feature allows the user to select dimensions of a window from a set of known window dimensions for startup of the selected application.

Preferably, the set of predefined window dimensions are definable by a user. Advantageously, this feature allows a user to specify their own preferred dimensions for startup of the selected application.

Preferably, the window location and size are determined by the location on screen of the gesture input. Advantageously, this feature allows a user to specify the position at which a window will open.

Preferably, the start of the time period is defined by the holding down of a selection button and the end of the time period is defined by the release of the selection button. Advantageously, this feature provides another way of entering window parameters in which the user can exactly control the time period for gesture entry.

Preferably, the window location selected occupies one of a full screen, two full screens, a half screen, a quarter screen, and a minimized location. Advantageously, this feature provides particular screen fractions as window locations.

Preferably, the window location selected is on a secondary display screen. Advantageously, this feature allows a second display to be specified directly as the location of an application window.

Viewed from a second aspect, the present invention provides a computing apparatus for controlling how an application window of a graphical user interface will open on display screen apparatus. The apparatus comprises: a timer component for defining a time period immediately after an application launch selection action by a user and before the drawing on screen of the application window; a listener process component for sensing a gesture input during the time period; a gesture recognition engine component for recognizing the gesture input; a selector component for selecting by the computing apparatus, based on at least one of a type and location of the recognized gesture input, a window location and dimensions; and a window manager component for drawing the window on screen using the location and dimensions selected.

Preferably, the invention further provides apparatus for performing the further steps of the method of the first aspect.

Viewed from a third aspect, the invention provides a computer program comprising computer program code stored on a computer readable medium to, when loaded into a computer system and executed thereon, cause the computer system to perform all the steps of a method according to the first aspect.

It will be apparent to a person skilled in the art that the above embodiments are provided for illustration and that further variations, improvements and modifications may be envisaged without departing from the scope of the invention.

What is claimed is:

1. A method comprising:
    defining, by a computing device, a time period immediately after an application launch selection action by a user and before displaying an application window on a first display of the computing device and a second display of the computing device;
    sensing, by a gesture input hardware sensing device, a first gesture input part during the time period, wherein the first gesture input part is a first user-created input that draws a geometric shape on the first display of the computing device;
    sensing, by the gesture input hardware sensing device, a second gesture input part during the time period, wherein the second gesture input part is a second user-created input that draws a line that crosses from the first display to the second display;
    sensing, by the gesture input hardware sensing device, a third gesture input part during the time period, wherein the third gesture input part is a third user-created input that draws the geometric shape on the second display of the computing device;
    recognizing the first gesture input part, the second gesture input part, and the third gesture input part by a gesture recognition engine; and
    in response to the gesture recognition engine recognizing the first gesture input part, the second gesture input part, and the third gesture input part, displaying, by the computing device, the application window across areas of both the first display and the second display.

2. The method of claim 1 further comprising:
    sensing, by the computing device, continuing gesture input at an end of the time period; and
    extending, by the computing device, the time period by an additional time period so as to allow recognition of a further gesture input.

3. The method of claim 1, wherein the first gesture input part, the second gesture input part, and the third gesture input part are generated by a cursor control device that does not contact the first display and the second display that are displaying the application window.

4. The method of claim 3, wherein the cursor control device comprises one of a mouse, a joystick, a trackball and a touchpad.

5. The method of claim 1, wherein the time period is a predefined amount of time.

6. The method of claim 1, wherein the areas of both the first display and the second display are specific halves of the first display and the second display.

7. The method of claim 1, wherein the areas of both the first display and the second display are specific quadrants of the first display and the second display.

8. The method of claim 1, wherein the areas of both the first display and the second display are full areas of both the first display and the second display.

9. A computing apparatus for controlling how an application window of a graphical user interface will open on a display screen apparatus, the computing apparatus comprising:
    a timer hardware component for defining a time period immediately after an application launch selection action by a user and before displaying the application window on a first display screen apparatus and a second display screen apparatus of a computing device;
    a listener process hardware component for:
        sensing a first gesture input part during the time period, wherein the first gesture input part is a first user-created input that draws a geometric shape on the first display screen apparatus of the computing device;
        sensing a second gesture input part during the time period, wherein the second gesture input part is a second user-created input that draws a line that crosses from the first display screen apparatus to the second display screen apparatus; and
        sensing a third gesture input part during the time period, wherein the third gesture input part is a third user-created input that draws the geometric shape on the second display screen apparatus of the computing device;
    a gesture recognition engine hardware component for recognizing the first gesture input part, the second gesture input part, and the third gesture input part by a gesture recognition engine; and
    a display controller for, in response to the gesture recognition engine recognizing the first gesture input part, the second gesture input part, and the third gesture input part, displaying the application window across areas of both the first display screen apparatus and the second display screen apparatus.

10. The computing apparatus as claimed in claim 9, wherein the listener process hardware component senses continuing gesture input at an end of the time period, and wherein the computing hardware apparatus extends the time period by an additional time period so as to allow recognition of a further gesture input.

11. The computing apparatus as claimed in claim 9, wherein the first gesture input part, the second gesture input part, and the third gesture input part are generated by a cursor control device that does not contact a screen apparatus that is displaying the application window.

12. The computing apparatus as claimed in claim 9, wherein a start of the time period is defined by holding down a selection button and an end of the time period is defined by a release of the selection button, wherein the listener process hardware component receives, from the user, the user-created input that draws the geometric shape while the selection button is being held down, and wherein the computing device launches the application window in the selected window location in response to the selection button being released.

13. The computing apparatus as claimed in claim 9, wherein the areas of both the first display screen apparatus and the second display screen apparatus are specific halves of the first display screen apparatus and the second display screen apparatus.

14. The computing apparatus as claimed in claim 9, wherein the areas of both the first display screen apparatus and the second display screen apparatus are specific quadrants of the first display screen apparatus and the second display screen apparatus.

15. The computing apparatus as claimed in claim 9, wherein the areas of both the first display screen apparatus and the second display screen apparatus are full areas of both the first display screen apparatus and the second display screen apparatus.

16. A computer program product for controlling how an application window of a graphical user interface will open, the computer program product comprising a computer readable storage medium having program code embodied therewith, the program code readable and executable by a processor to perform a method comprising:

defining a time period immediately after an application launch selection action by a user and before displaying an application window on a first display of the computing device and a second display of the computing device;

sensing a first gesture input part during the time period, wherein the first gesture input part is a first user-created input that draws a geometric shape on the first display of the computing device;

sensing a second gesture input part during the time period, wherein the second gesture input part is a second user-created input that draws a line that crosses from the first display to the second display;

sensing a third gesture input part during the time period, wherein the third gesture input part is a third user-created input that draws the geometric shape on the second display of the computing device;

recognizing the first gesture input part, the second gesture input part, and the third gesture input part by a gesture recognition engine; and in response to recognizing the first gesture input part, the second gesture input part, and the third gesture input part, displaying the application window across areas of both the first display and the second display.

17. The computer program product of claim 16, wherein the method further comprises:

sensing continuing gesture input at an end of the time period; and extending the time period by an additional time period so as to allow recognition of a further gesture input.

18. The computer program product of claim 16, wherein a start of the time period is defined by holding down a selection button and an end of the time period is defined by a release of the selection button, wherein a computing device receives, from the user, the user-created input that draws the geometric shape while the selection button is being held down, and wherein the computing device launches the application window in the selected window location in response to the selection button being released.

19. The computer program product of claim 16, wherein the first gesture input part, the second gesture input part, and the third gesture input part are generated by a cursor control device that does not contact a screen apparatus that is displaying the application window.

20. The computer program product of claim 16, wherein the areas of both the first display and the second display are full areas of both the first display and the second display.

* * * * *